US007775660B2

(12) United States Patent
Stewart et al.

(10) Patent No.: US 7,775,660 B2
(45) Date of Patent: *Aug. 17, 2010

(54) ELECTRO-ACTIVE OPHTHALMIC LENS HAVING AN OPTICAL POWER BLENDING REGION

(75) Inventors: Wilber C. Stewart, East Windsor, NJ (US); Joseph T. McGinn, Flemington, NJ (US); Joshua N. Haddock, Roanoke, VA (US); William Kokonaski, Gig Harbor, WA (US); Venkatramani S. Iyer, Roanoke, VA (US); Ronald D. Blum, Roanoke, VA (US)

(73) Assignee: E-Vision LLC, Roanoke, VA (US)

( * ) Notice: Subject to any disclaimer, the term of this patent is extended or adjusted under 35 U.S.C. 154(b) by 452 days.

This patent is subject to a terminal disclaimer.

(21) Appl. No.: 11/595,971

(22) Filed: Nov. 13, 2006

(65) Prior Publication Data

US 2007/0052920 A1 Mar. 8, 2007

Related U.S. Application Data

(63) Continuation-in-part of application No. 11/091,104, filed on Mar. 28, 2005, now Pat. No. 7,188,948, which is a continuation of application No. 09/602,013, filed on Jun. 23, 2000, now Pat. No. 6,619,799.

(60) Provisional application No. 60/161,363, filed on Oct. 26, 1999, provisional application No. 60/150,564, filed on Aug. 25, 1999, provisional application No. 60/150,545, filed on Aug. 25, 1999, provisional application No. 60/147,813, filed on Aug. 10, 1999, provisional application No. 60/143,626, filed on Jul. 14, 1999, provisional application No. 60/142,053, filed on Jul. 2, 1999.

(51) Int. Cl.
*G02C 7/06* (2006.01)
*G02F 1/1335* (2006.01)
*G02F 1/29* (2006.01)

(52) U.S. Cl. .................. 351/169; 349/13; 351/168; 359/319

(58) Field of Classification Search ................ 351/159, 351/168–172; 349/13; 359/319
See application file for complete search history.

(56) References Cited

U.S. PATENT DOCUMENTS 2,437,642 A 3/1948 Henroleau (Continued)

FOREIGN PATENT DOCUMENTS

CN ROC89113088 10/2001

(Continued)

OTHER PUBLICATIONS

Kowel, Stephen T., et. al; Focusing by electrical modulation of refraction in a liquid crystal cell; Applied Optics; Jan. 15, 1984; vol. 23, No. 2.

(Continued)

*Primary Examiner*—Scott J Sugarman
(74) *Attorney, Agent, or Firm*—Townsend and Townsend and Crew

(57) ABSTRACT

The present invention generally relates to an electro-active optic incorporating a blend region between two regions each having different optical properties.

21 Claims, 6 Drawing Sheets

U.S. PATENT DOCUMENTS

| | | |
|---|---|---|
| 2,576,581 A | 11/1951 | Edwards |
| 3,161,718 A | 12/1964 | De Luca |
| 3,245,315 A | 4/1966 | Marks et al. |
| 3,248,460 A | 4/1966 | Naujokas |
| 3,309,162 A | 3/1967 | Kosanke et al |
| 3,524,702 A | 8/1970 | Bellows et al. |
| 3,614,215 A | 10/1971 | Mackta |
| 3,738,734 A | 6/1973 | Tait et al. |
| 3,791,719 A | 2/1974 | Kratzer et al. |
| 4,062,629 A | 12/1977 | Winthrop |
| 4,105,302 A | 8/1978 | Tate, Jr. |
| 4,174,156 A | 11/1979 | Glorieux |
| 4,181,408 A | 1/1980 | Senders |
| 4,190,330 A | 2/1980 | Berreman |
| 4,190,621 A | 2/1980 | Greshes |
| 4,264,154 A | 4/1981 | Petersen |
| 4,279,474 A | 7/1981 | Belgorod |
| 4,300,818 A | 11/1981 | Schachar |
| 4,320,939 A | 3/1982 | Mueller |
| 4,373,218 A | 2/1983 | Schachar |
| 4,395,736 A | 7/1983 | Fraleux |
| 4,418,990 A | 12/1983 | Gerber |
| 4,423,929 A | 1/1984 | Gomi |
| 4,457,585 A | 7/1984 | DuCorday |
| 4,461,550 A | 7/1984 | Legendre |
| 4,466,703 A | 8/1984 | Nishimoto |
| 4,466,706 A | 8/1984 | Lamothe, II |
| 4,529,268 A | 7/1985 | Brown |
| 4,564,267 A | 1/1986 | Nishimoto |
| 4,572,616 A | 2/1986 | Kowel et al. |
| 4,577,928 A | 3/1986 | Brown |
| 4,601,545 A | 7/1986 | Kern |
| 4,609,824 A | 9/1986 | Munier et al. |
| 4,712,870 A | 12/1987 | Robinson et al. |
| 4,756,605 A | 7/1988 | Okada et al. |
| 4,772,094 A | 9/1988 | Sheiman |
| D298,250 S | 10/1988 | Kildall |
| 4,787,733 A | 11/1988 | Silva |
| 4,787,903 A | 11/1988 | Grendahl |
| 4,795,248 A | 1/1989 | Okada et al. |
| 4,813,777 A | 3/1989 | Rainville et al. |
| 4,818,095 A | 4/1989 | Takeuchi |
| 4,836,652 A | 6/1989 | Oishi et al. |
| 4,842,400 A | 6/1989 | Klein |
| 4,869,588 A | 9/1989 | Frieder et al. |
| 4,873,029 A | 10/1989 | Blum |
| 4,880,300 A | 11/1989 | Payner et al. |
| 4,890,903 A | 1/1990 | Treisman et al. |
| 4,904,063 A | 2/1990 | Okada et al. |
| 4,907,860 A | 3/1990 | Noble |
| 4,909,626 A | 3/1990 | Purvis et al. |
| 4,919,520 A | 4/1990 | Okada et al. |
| 4,921,728 A | 5/1990 | Takiguchi |
| 4,927,241 A | 5/1990 | Kuijk |
| 4,929,865 A | 5/1990 | Blum |
| 4,930,884 A | 6/1990 | Tichenor et al. |
| 4,944,584 A | 7/1990 | Maeda et al. |
| 4,945,242 A | 7/1990 | Berger et al. |
| 4,952,048 A | 8/1990 | Frieder et al. |
| 4,952,788 A | 8/1990 | Berger et al. |
| 4,955,712 A | 9/1990 | Barth et al. |
| 4,958,907 A | 9/1990 | Davis |
| 4,961,639 A | 10/1990 | Lazarus |
| 4,968,127 A | 11/1990 | Russell et al. |
| 4,981,342 A | 1/1991 | Fiala |
| 4,991,951 A | 2/1991 | Mizuno et al. |
| 5,015,086 A | 5/1991 | Okaue et al. |
| 5,030,882 A | 7/1991 | Solero |
| 5,050,981 A | 9/1991 | Roffman |
| 5,066,301 A | 11/1991 | Wiley |
| 5,067,795 A | 11/1991 | Senatore |
| 5,073,021 A | 12/1991 | Marron |
| 5,076,665 A | 12/1991 | Petersen |
| 5,089,023 A | 2/1992 | Swanson |
| 5,091,801 A | 2/1992 | Ebstein |
| 5,108,169 A | 4/1992 | Mandell |
| 5,114,628 A | 5/1992 | Hofer et al. |
| 5,130,856 A | 7/1992 | Tichenor et al. |
| 5,142,411 A | 8/1992 | Fiala |
| 5,147,585 A | 9/1992 | Blum |
| 5,150,234 A | 9/1992 | Takahashi et al. |
| 5,171,266 A | 12/1992 | Wiley et al. |
| 5,178,800 A | 1/1993 | Blum |
| 5,182,585 A | 1/1993 | Stoner |
| 5,184,156 A | 2/1993 | Black et al. |
| 5,200,859 A | 4/1993 | Payner et al. |
| 5,208,688 A | 5/1993 | Fergason et al. |
| 5,219,497 A | 6/1993 | Blum |
| 5,229,797 A | 7/1993 | Futhey et al. |
| 5,229,885 A | 7/1993 | Quaglia |
| 5,231,430 A | 7/1993 | Kohayakawa |
| 5,239,412 A | 8/1993 | Naka et al. |
| D342,063 S | 12/1993 | Howitt et al. |
| 5,305,028 A | 4/1994 | Okano |
| 5,306,926 A | 4/1994 | Yonemoto |
| 5,324,930 A | 6/1994 | Jech, Jr. |
| D350,342 S | 9/1994 | Sack |
| 5,352,886 A | 10/1994 | Kane |
| 5,359,444 A | 10/1994 | Piosenka et al. |
| 5,375,006 A | 12/1994 | Haas |
| 5,382,986 A | 1/1995 | Black et al. |
| 5,386,308 A | 1/1995 | Michel et al. |
| 5,412,439 A | 5/1995 | Horn |
| 5,424,927 A | 6/1995 | Schaller et al. |
| 5,440,357 A | 8/1995 | Quaglia |
| 5,443,506 A | 8/1995 | Garabet |
| 5,451,766 A | 9/1995 | Van Berkel |
| 5,488,439 A | 1/1996 | Weltmann |
| 5,512,371 A | 4/1996 | Gupta et al. |
| 5,552,841 A | 9/1996 | Gallorini et al. |
| 5,608,567 A | 3/1997 | Grupp |
| 5,615,588 A | 4/1997 | Gottschald |
| 5,654,786 A | 8/1997 | Bylander |
| 5,668,620 A | 9/1997 | Kurtin et al. |
| 5,675,399 A | 10/1997 | Kohayakawa |
| 5,682,223 A | 10/1997 | Menezes et al. |
| 5,683,457 A | 11/1997 | Gupta et al. |
| RE35,691 E | 12/1997 | Theirl et al. |
| 5,702,819 A | 12/1997 | Gupta et al. |
| 5,712,721 A | 1/1998 | Large |
| 5,728,155 A | 3/1998 | Anello et al. |
| 5,739,959 A | 4/1998 | Quaglia |
| 5,777,719 A | 7/1998 | Williams et al. |
| 5,815,233 A | 9/1998 | Morokawa et al. |
| 5,815,239 A | 9/1998 | Chapman et al. |
| 5,859,685 A | 1/1999 | Gupta et al. |
| 5,861,934 A | 1/1999 | Blum et al. |
| 5,861,936 A | 1/1999 | Sorensen |
| 5,877,876 A | 3/1999 | Birdwell |
| 5,894,363 A | 4/1999 | Yamada et al. |
| 5,900,720 A | 5/1999 | Kallman et al. |
| 5,949,521 A | 9/1999 | Williams et al. |
| 5,953,098 A | 9/1999 | Lieberman et al. |
| 5,953,099 A | 9/1999 | Walach |
| 5,956,183 A | 9/1999 | Epstein et al. |
| 5,963,300 A | 10/1999 | Horwitz |
| 5,971,540 A | 10/1999 | Ofner |
| 5,980,037 A | 11/1999 | Conway |
| 5,999,328 A | 12/1999 | Kurtin et al. |
| 6,040,947 A | 3/2000 | Kurtin et al. |
| 6,050,687 A | 4/2000 | Bille et al. |
| 6,069,742 A | 5/2000 | Silver |
| 6,086,203 A | 7/2000 | Blum et al. |
| 6,086,204 A | 7/2000 | Magnante |

| Patent No. | Date | Inventor |
|---|---|---|
| 6,095,651 A | 8/2000 | Williams et al. |
| 6,099,117 A | 8/2000 | Gregory |
| 6,115,177 A | 9/2000 | Vossler |
| 6,139,148 A | 10/2000 | Menezes |
| 6,145,987 A | 11/2000 | Baude et al. |
| 6,188,525 B1 | 2/2001 | Silver |
| 6,191,881 B1 | 2/2001 | Tajima |
| 6,199,984 B1 | 3/2001 | Menezes |
| 6,213,602 B1 | 4/2001 | Smarto |
| 6,270,220 B1 | 8/2001 | Keren |
| 6,271,915 B1 | 8/2001 | Frey et al. |
| 6,305,802 B1 | 10/2001 | Roffman et al. |
| 6,317,190 B1 | 11/2001 | Winarski et al. |
| 6,325,508 B1 | 12/2001 | Decreton et al. |
| 6,339,459 B1 | 1/2002 | Jehikawa et al. |
| 6,350,031 B1 | 2/2002 | Lashkari et al. |
| 6,390,623 B1 | 5/2002 | Kokonaski et al. |
| 6,396,622 B1 | 5/2002 | Alden |
| 6,437,762 B1 | 8/2002 | Birdwell |
| 6,437,925 B1 | 8/2002 | Nishioka |
| 6,464,363 B1 | 10/2002 | Nishioka et al. |
| 6,491,394 B1 | 12/2002 | Blum et al. |
| 6,501,443 B1 | 12/2002 | McMahon |
| 6,554,425 B1 | 4/2003 | Roffman et al. |
| 6,609,794 B2 | 8/2003 | Levine |
| 6,614,408 B1 | 9/2003 | Mann |
| 6,616,275 B1 | 9/2003 | Dick et al. |
| 6,616,279 B1 | 9/2003 | Davis et al. |
| 6,618,208 B1 | 9/2003 | Silver |
| 6,626,532 B1 | 9/2003 | Nishioka et al. |
| 6,631,001 B2 | 10/2003 | Kuiseko |
| 6,652,096 B1 | 11/2003 | Morris et al. |
| 6,682,195 B2 | 1/2004 | Dreher |
| 6,709,105 B2 | 3/2004 | Menezes |
| 6,709,107 B2 | 3/2004 | Jiang et al. |
| 6,709,108 B2 | 3/2004 | Levine et al. |
| 6,738,199 B2 | 5/2004 | Nishioka |
| 6,761,454 B2 | 7/2004 | Lai et al. |
| 6,768,536 B2 | 7/2004 | Okuwaki et al. |
| 6,774,871 B2 | 8/2004 | Birdwell |
| 6,778,246 B2 | 8/2004 | Sun et al. |
| 6,793,340 B1 | 9/2004 | Morris et al. |
| 6,833,938 B2 | 12/2004 | Nishioka |
| 6,840,619 B2 | 1/2005 | Dreher |
| 6,851,805 B2 | 2/2005 | Blum et al. |
| 6,857,741 B2 * | 2/2005 | Blum et al. ................. 351/168 |
| 6,859,333 B1 | 2/2005 | Ren et al. |
| 6,883,916 B2 | 4/2005 | Menezes |
| 6,886,938 B1 | 5/2005 | Menezes |
| 6,893,124 B1 | 5/2005 | Kurtin |
| 6,902,271 B2 | 6/2005 | Perrott et al. |
| 6,918,670 B2 | 7/2005 | Blum et al. |
| 6,948,818 B2 | 9/2005 | Williams et al. |
| 6,951,391 B2 | 10/2005 | Morris et al. |
| 6,955,433 B1 | 10/2005 | Wooley et al. |
| 6,956,682 B2 | 10/2005 | Wooley |
| 6,986,579 B2 | 1/2006 | Blum et al. |
| 7,008,054 B1 | 3/2006 | Kurtin et al. |
| 7,009,757 B2 | 3/2006 | Nishioka et al. |
| 7,019,890 B2 | 3/2006 | Meredith et al. |
| 7,041,133 B1 | 5/2006 | Azar |
| 7,073,906 B1 | 7/2006 | Portney |
| 7,085,065 B2 | 8/2006 | Silver |
| 7,133,172 B2 | 11/2006 | Nishioka |
| 7,159,981 B2 | 1/2007 | Kato |
| 7,159,983 B2 | 1/2007 | Menezes et al. |
| 7,209,097 B2 | 4/2007 | Suyama |
| 7,229,173 B2 | 6/2007 | Menezes et al. |
| 7,396,126 B2 * | 7/2008 | Blum et al. ................. 351/169 |
| 7,475,984 B2 * | 1/2009 | Blum et al. ................. 351/168 |
| 7,475,985 B2 * | 1/2009 | Blum et al. ................. 351/169 |
| 2001/0055094 A1 | 12/2001 | Zhang |
| 2002/0140899 A1 | 10/2002 | Blum et al. |
| 2002/0149739 A1 | 10/2002 | Perrott et al. |
| 2002/0186346 A1 | 12/2002 | Stantz et al. |
| 2003/0018383 A1 | 1/2003 | Azar |
| 2003/0151721 A1 | 8/2003 | Lai et al. |
| 2003/0210377 A1 | 11/2003 | Blum et al. |
| 2004/0008319 A1 | 1/2004 | Lai et al. |
| 2004/0108971 A1 | 6/2004 | Waldern et al. |
| 2004/0117011 A1 | 6/2004 | Aharoni et al. |
| 2004/0130677 A1 | 7/2004 | Liang et al. |
| 2004/0179280 A1 | 9/2004 | Nishioka |
| 2004/0196435 A1 | 10/2004 | Dick et al. |
| 2004/0246440 A1 | 12/2004 | Andino et al. |
| 2005/0073739 A1 | 4/2005 | Meredith |
| 2005/0124983 A1 | 6/2005 | Frey et al. |
| 2005/0140924 A1 | 6/2005 | Blum et al. |
| 2006/0044510 A1 | 3/2006 | Williams et al. |
| 2006/0164593 A1 | 7/2006 | Peyghambarian |

FOREIGN PATENT DOCUMENTS

| | | |
|---|---|---|
| DE | 4222395 | 1/1994 |
| DE | 4223395 | 1/1994 |
| EP | 0027339 | 4/1981 |
| EP | 0154962 A2 | 9/1985 |
| EP | 0233104 A1 | 8/1987 |
| EP | 0237365 A1 | 9/1987 |
| EP | 0308705 | 3/1989 |
| EP | 0578833 | 1/1994 |
| EP | 0649044 | 4/1995 |
| GB | 1536891 | 12/1978 |
| GB | 2038020 | 7/1980 |
| GB | 08-2170613 A | 8/1986 |
| GB | 2169417 A | 7/1987 |
| JP | 55-076323 | 6/1980 |
| JP | S 55 76323 | 6/1980 |
| JP | 61 156227 | 7/1986 |
| JP | 61-177429 | 8/1986 |
| JP | 62-209412 | 9/1987 |
| JP | 1 237610 | 9/1989 |
| JP | 05-100201 | 4/1993 |
| JP | 7-28002 | 1/1995 |
| JP | 11352445 | 12/1998 |
| JP | 2007-323062 | 12/2007 |
| WO | WO-92/01417 | 2/1992 |
| WO | WO 93/21010 | 10/1993 |
| WO | WO-98/27863 | 7/1998 |
| WO | WO-99/27334 | 6/1999 |
| WO | WO-03/050472 A1 | 6/2003 |
| WO | WO-03/068059 A2 | 8/2003 |
| WO | WO-2004/008189 A1 | 1/2004 |
| WO | WO-2004/015481 A1 | 2/2004 |
| WO | WO-2004/034095 A2 | 4/2004 |
| WO | WO-2004/072687 A2 | 8/2004 |

OTHER PUBLICATIONS

Thibos, Larry N , et al.; Vision through a liquid-crystal spatial light modulator; Adaptive Optics Conference; 1999; Durham, UK.

Miller, Donald T, et al.; Requirements for Segmented Spatial Light Modulators For Diffraction-Limited Imaging Through Aberrated Eyes, Adaptive Optics Conference.

Thibos, Larry N , et. al ; Use of Liquid-Crystal Adaptive-Optics to Alter the Refractive State of the Eye; Optometry and Vision Science; Jul. 1997; vol. 74, No. 7; American Academy of Optometry.

Thibos, Larry N., et. al.; Electronic Spectacles for the 21$^{st}$ Century, Indian Journal of Optometry, Spring 1999; vol. 2, No. 1.

Bradley, Arthur; Profile: Larry N Thibos, PhD , and Donald T Miller, PhD.; Indiana Journal of Optometry; Spring 1999; vol. 2, No. 1.

Naumov, A.F ; Control Optimization of Spherical Modal Liquid Crystal Lenses; Optics Express, Apr. 26, 1999; vol. 4, No. 9; Optical Society of America.

Naumov, A.F.; Liquid Crystal Adaptive Lenses with Modal Control; Optics Letters, Jul. 1, 1998, vol. 23, No. 13; Optical Society of America.

Liquid Lenses Eye Commercial Breakthrough; Opto & Laser Europe, Nov. 2003.

Anderson, M.; Adaptive Optics: Liquid Crystals Lower the Cost of Adaptive Optics; Laser Focus World, Dec. 1999.

Davis, Robert A.; Computer Vision Syndrome- The Eyestrain Epidemic ; Review of Optometry, Sep. 15, 1997.

Lazarus, Stuart M.; The Use of Yoked Base-Up and Base-In Prism for Reducing Eye Strain at the Computer; Journal of the American Optometric Association, Apr. 1996.

Eyecare Business, Oct. 1997.

International Search Report for International Application No. PCT/US07/83780, completed Sep. 29, 2008, pp. 1-9.

Liang J. et al., "Hartmann-shack sensor as a component in active optical system to improve the depth resolution of the laser tomographic scanner", *Proceedings of the SPIE*, SPIE, Bellingham, VA, US, 1542:543-554, XPOO1038099 (1991).

International Search Report in U.S. Appl. No. PCT/US00/17957 issued Oct. 11, 2000.

International Search Report in U.S. Appl. No. PCT/US00/17964 issued Nov. 8, 2000.

International Search Report in U.S. Appl. No. PCT/US00/17963 issued Oct. 12, 2000.

International Search Report in U.S. Appl. No. PCT/US00/17958 issued Oct. 16, 2000.

International Search Report in U.S. Appl. No. PCT/US07/83780 issued Oct. 6, 2008.

Supplementary European Search Report in U.S. Appl. No. EP00945002 issued Jan. 29, 2004.

European Search Report in U.S. Appl. No. EP03078447 issued Dec. 12, 2006.

European Search Report in U.S. Appl. No. EP07112473 issued Oct. 10, 2007.

* cited by examiner

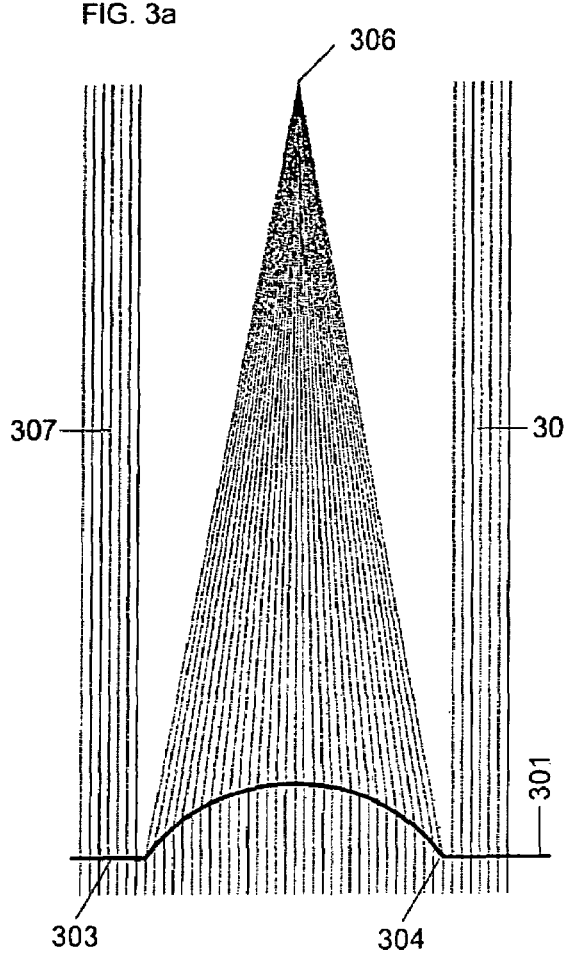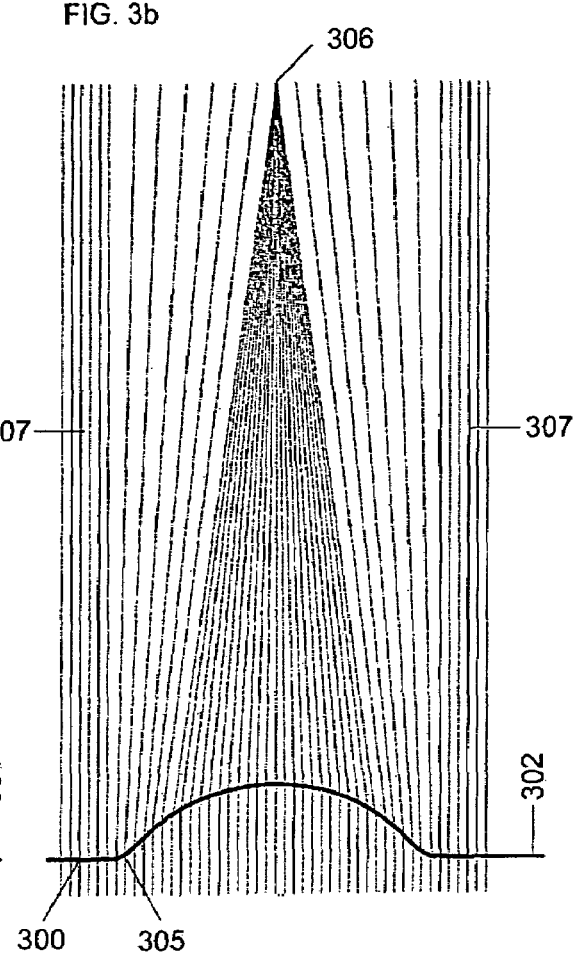
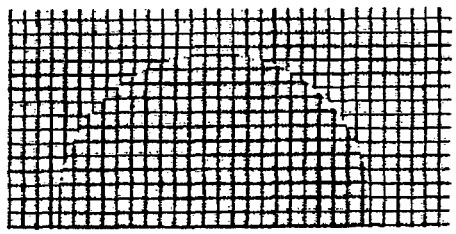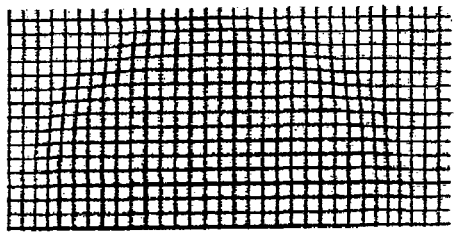
FIG. 3a  FIG. 3b
FIG. 4a  FIG. 4b

ELECTRO-ACTIVE OPHTHALMIC LENS HAVING AN OPTICAL POWER BLENDING REGION

CROSS REFERENCE TO RELATED APPLICATIONS

This application is a continuation in part of U.S. patent application Ser. No. 11/091,104, titled "EA Spectacles" filed on 28 Mar. 2005, now U.S. Pat. No. 7,188,948 which is, in turn, a continuation of U.S. patent application Ser. No. 09/602,013, filed Jun. 23, 2000, now U.S. Pat. No. 6,619,799, and which, in turn, claims priority to the following U.S. Provisional Patent Applications, all of which are hereby incorporated by reference in their entirety:

Ser. No. 60/142,053, titled "Electro-Active Spectacles", filed 2 Jul. 1999;

Ser. No. 60/143,626, titled "Electro-Active Spectacles", filed 14 Jul. 1999;

Ser. No. 60/147,813, titled "Electro-Active Refraction, Dispensing, & Eyewear", filed 10 Aug. 1999;

Ser. No. 60/150,545, titled "Advanced Electro-Active Spectacles", filed 25 Aug. 1999;

Ser. No. 60/150,564, titled "Electro-Active Refraction, Dispensing, & Eyewear", filed 25 Aug. 1999; and Ser. No. 60/161,363, titled "Comprehensive Electro-Active Refraction, Dispensing, & Eyewear" filed 26 Oct. 1999.

This invention also relates to the following U.S. patent applications, which claim the same priority as U.S. application Ser. No. 11/091,104, referenced above, and which are incorporated herein by reference in their entirety:

Ser. No. 10/626,973, titled "System, Apparatus, and Method for Correcting Vision Using an Electro-Active Lens", filed 25 Jul. 2003, now U.S. Pat. No. 6,918,670; and Ser. No. 11/407,171, titled "System, Apparatus, and Method for Correcting Vision Using an Electro-Active Lens", filed 20 Apr. 2006.

This invention also relates to the following U.S. patent applications, which have the same priority filing as U.S. Pat. No. 6,619,799 referenced above, and which are incorporated herein by reference in their entirety:

"System, Apparatus, and Method for Correcting Vision Using Electro-Active Spectacles", U.S. application Ser. No. 09/602,012, filed Jun. 23, 2000, now U.S. Pat. No. 6,517,203;

"Method for Refracting and Dispensing Electro-Active Spectacles", U.S. application Ser. No. 09/602,014, filed Jun. 23, 2000, now U.S. Pat. No. 6,491,394; and "System, Apparatus, and Method for Reducing Birefringence", U.S. application Ser. No. 09/603,736, filed Jun. 23, 2000, now U.S. Pat. No. 6,491,391.

BACKGROUND OF THE INVENTION

1. Field of the Invention

The present invention generally relates to an electro-active optic incorporating a blend region between two regions each having different optical properties. Specifically, the blend region is a smoothing region which transitions between two areas each having a different refractive index. More specifically, the smoothing blend region may be an electro-active transition between two optical areas each having a different optical powers. By having an electro-active smoothing blend region, a continuous transition between different optical properties and powers may be accomplished with heretofore unrealized results.

2. Description of the Related Art

Electro-active ophthalmic lenses for presbyopia correction are static, refractive ophthalmic lenses that incorporate a dynamic, diffractive, electro-active optical element The diffractive optical element allows one to switch on and off a region of optical add power that utilizes an electro-active medium such as liquid crystal. The electro-active element typically represents only a fraction of the total area of the lens and as such, possesses an abrupt peripheral edge where the optical power (focal length) of the total lens discontinuously changes from the optical power of the refractive lens to the combined optical power of the refractive lens and the diffractive electro-active element. This discontinuity in optical power results in an image jump that may be objectionable to patients. In embodiments of the current invention, an electro-active blend region that acts to mitigate the objectionable image jump is described.

There is therefore a great need in the art for an optical transition which mitigates and eases the optical jump objected to by some patients. Accordingly, there is now provided with this invention an improved blend region which effectively overcomes the aforementioned difficulties and longstanding problems inherent in optical transitions.

SUMMARY OF THE INVENTION

According to one aspect of the invention, an electro-active lens is disclosed comprising at least one electro-active blend region. When power is applied thereto, the blend region provides a substantially continuous transition of optical power from a first region of optical power to a second region of optical power of said lens.

According to another aspect of an embodiment of the invention, an electro-active lens is disclosed which comprises a refractive lens of fixed optical power; and an electro-active element having dynamic optical power and a peripheral edge in optical communication with the refractive lens. The optical power of the electro-active lens is the sum of the optical powers of the electro-active element and the refractive lens. When the electro-active element is activated, the electro-active element provides for a region of substantially continuous transition in optical power from the sum of optical powers of the electro-active element and the refractive lens to the optical power of the refractive lens. The transition region is located near the peripheral edge of said electro-active element.

A further aspect of an embodiment of the present invention may include an electro-active lens, comprising at least one electro-active blend region. When power is applied thereto, the blend region provides at least one stepped transition of optical power from a first region of optical power to a second region of optical power of the lens.

A still further aspect of an embodiment of the present invention may include an electro-active lens comprising at least one region of fixed optical power; and at least one region of dynamic optical power having a blend region. When power is applied to the blend region, the blend region has diffractive power and provides a continuous transition of optical power from the dynamic power region to the fixed power region.

As will be appreciated by those persons skilled in the art, a major advantage provided by the present invention is to provide a blend region which smooths the transition between two areas each having a different refractive index forming a substantially continuous transition therebetween. Another object of the present invention is to provide an electro-active transition between two optical areas each having a different optical powers. By having an electro-active smoothing blend region, a continuous transition between different optical properties and powers may be accomplished. Additional objects of the present invention will become apparent from the following description.

The method and apparatus of the present invention will be better understood by reference to the following detailed discussion of specific embodiments and the attached figures which illustrate and exemplify such embodiments.

DESCRIPTION OF THE DRAWINGS

A specific embodiment of the present invention will be described with reference to the following drawings, wherein:

FIG. 1c illustrates an optical power profile of an electro-active lens without a blend region when the electro-active element is on;

FIG. 1d illustrates an optical power profile of an electro-active lens with a blend region when the electro-active element is on;

FIG. 2a illustrates the phase profile (shape) 200 of a refractive lens with a desired focal length;

FIG. 2b illustrates a diffractive lens consisting of 3 full wave Fresnel zones, formed by phase wrapping the refractive lens of FIG. 2a;

FIG. 2c illustrates the continuous, wrapped phase profile of FIG. 2b, subdivided into a series of equidistant, phase levels;

FIG. 2d illustrates the continuous wrapped phase profile of FIGS. 2b and 2c, approximated by a series of equidistant, discrete phase levels, specifically, a multi-level diffractive phase profile;

FIG. 2e illustrates discrete, patterned electrodes meant to generate the phase profile of FIG. 2d within a layer of electro-active liquid crystal;

FIG. 3a shows the path of light rays through an electro-active lens without a blend region;

FIG. 3b shows the path of light rays through an electro-active lens with a blend region;

FIG. 4a is an image of a square grid as viewed through an electro-active lens without a blend region, as shown in FIG. 3a;

FIG. 4b is an image of a square grid as viewed through an electro-active lens with a blend region, as shown in FIG. 3b;

DESCRIPTION OF THE PREFERRED EMBODIMENT

The following preferred embodiment as exemplified by the drawings is illustrative of the invention and is not intended to limit the invention as encompassed by the claims of this application. An electro-active ophthalmic lens having a blend region is disclosed herein.

Figure 1A:
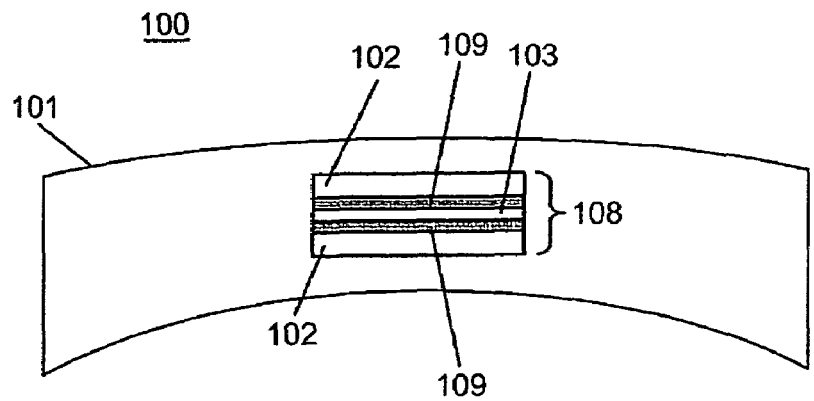
FIG. 1a shows a physical cross section through the thickness of an electro-active lens.

The apparatus 100, as illustrated generally in FIG. 1a, shows a device that may have at least 1 layer of liquid crystal and at least two layers of a substrate. Alternatively, an embodiment of the device of the present invention may have a plurality of layers of liquid crystal, for example, two layers and a plurality of substrates, for example three substrates. FIG. 1 shows an embodiment of an electro-active ophthalmic lens 100 in which an electro-active element 108 is encased within an ordinary refractive ophthalmic lens 101. The electro-active element 108, by way of example only, is comprised of at least two optical quality substrates 102, whose refractive index is mostly matched to refractive lens 101, and which are used to contain at least one layer of liquid crystal 103. Transparent electrodes 109 on the inner surfaces of the substrates 102 are used, in conjunction with an appropriate electrical driving source, to after the refractive index of the liquid crystal 103 so as to generate a diffractive optical element, as detailed below. Liquid crystal materials are comprised of anisotropically shaped organic molecules which possess a degree of orientational order, that is to say, ensembles of molecules tend to orient themselves in the same general direction. The anisotropy of the shape of the molecules results in an anisotropy of their bulk optical properties, such as their refractive index. By applying a voltage across a layer of liquid crystalline material, the resulting electric field acts to re-orient the liquid crystal molecules, thus changing the optical properties of the bulk material which an incoming optical wave may experience. An appropriate electrical driving force for re-orienting liquid crystal molecules may be, for example, a battery, or other electrical source as is well known to those skilled in the art, which may provide an electrical potential in the range from about 0 volts to about 50 volts.

The electro-active element differs from a display in that it is designed to focus light by means of optical diffraction, not to display an image. An ideal lens can be defined as a phase object in that it does not affect the amplitude of the optical waves that pass through it, only their phase. A circular lens of positive focal length brings light to a point focus by increasing the phase retardation of an incident optical wave from edge to center in a rotationally symmetric manner. For example, a circular lens that imparts a rotationally symmetric, parabolic phase retardation from edge-to-edge along a diameter of the lens will cause parallel rays of light to be brought to focus at the same point, regardless of the point at which any single ray enters the lens. As such, a lens with a parabolic phase profile will have constant optical power across its diameter. Optical power (the reciprocal of focal length) can be determined by taking the second derivative of the phase profile with respect to the radial position and in the case of the parabolic lens described above, the second derivative of a parabolic (quadratic) function is a constant.

Figure 2A:
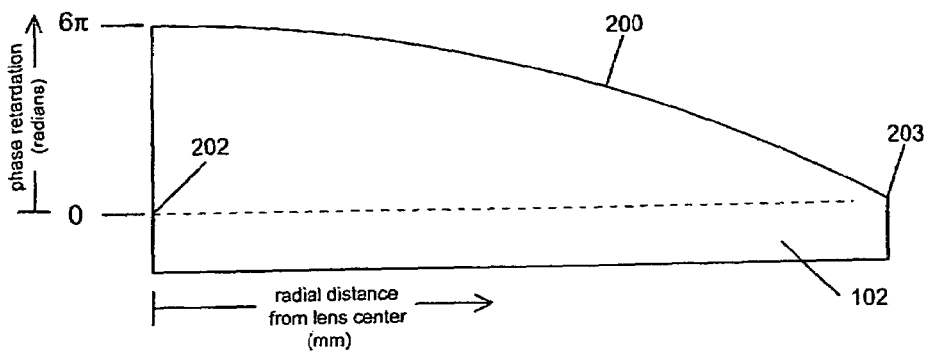
FIGS. 2a-2e generally illustrate a process for generating a diffractive lens to focus light.

As will be discussed below, lenses may focus light by either refraction (when the physical dimensions of the lens are much larger than the wavelength of light) and/or diffraction (when the physical dimensions of the lens are comparable to the wavelength of light). Thus, in an embodiment of the invention, the substrate 102 of the electro-active element may be a diffractive lens. A process for generating a diffractive lens to focus light is particularly illustrated in FIGS. 2a-2e. The phase profile (shape) 200 of a refractive lens with a desired focal length is shown in FIG. 2a. Making use of the symmetry of an ideal refractive lens, FIG. 2a represents the phase profile 200 of a refractive lens from the lens center 202 to the lens outer edge 203. The horizontal axis of FIGS. 2a-2e represents a radial distance r from the lens center to the lens edge in units of millimeters. In an embodiment of the invention, an ophthalmic refractive lens may have a diameter in the range from about 20 mm to about 80 mm. The vertical axis of FIGS. 2a-2d represents the phase retardation of the refractive and diffractive lenses as a function of radial position. The phase profile of the lens of FIGS. 2a-2d is related to the thickness modulation (d) of the diffractive structure in that the required phase retardation ($\phi$) is a function of the thickness modulation (d), the wavelength of light ($\lambda_o$), the refractive index of the substrate material ($n_{lens}$) and the refractive index of the optical material adjacent to the diffractive lens (n) via the relation $\phi=[2\pi d(n_{lens}-n)]\lambda_o$.

Figure 2B:
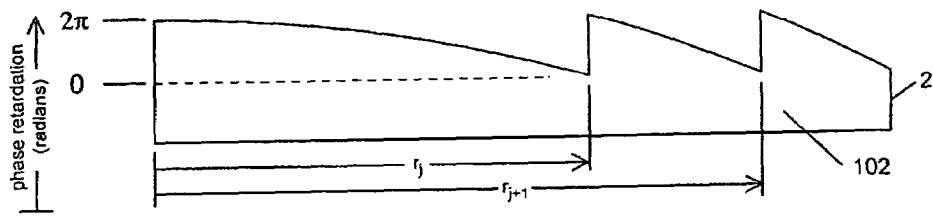

For the case of an electro-active diffractive lens the optical material adjacent to the diffractive surface is understood to be electro-active, such as a liquid crystalline material. To produce a diffractive lens with optical power equivalent to a refractive lens, the refractive phase profile 200 of FIG. 2a may be divided into full wave Fresnel zones or "phase wrapped" as shown in FIG. 2b. Phase wrapping is a process by which the values of the phase profile are generated modulo n2$\pi$, where n is an integer $\geq 1$. As an example, a refractive lens having a parabolic phase profile with maximum phase retardation of 6$\pi$ has a diffractive counterpart of equivalent optical power which comprises 3 full wave Fresnel zones, as illustrated in FIG. 2b. The width of each Fresnel zone, i.e. the distance from the lens center 202 is a function of the design wavelength ($\lambda_o$) and focal length ($f_o$) where the radius of the $j^{th}$ Fresnel zone ($r_j$) is given by $r_j=(2j\lambda_o f_o)^{1/2}$. The zero phase value location, as indicated in FIGS. 2b-2d is determined by the thickness of material required to generate a n2$\pi$ phase retardation and as discussed previously, a function of the optical wavelength and the refractive indices at that particular wavelength.

Figure 2C:
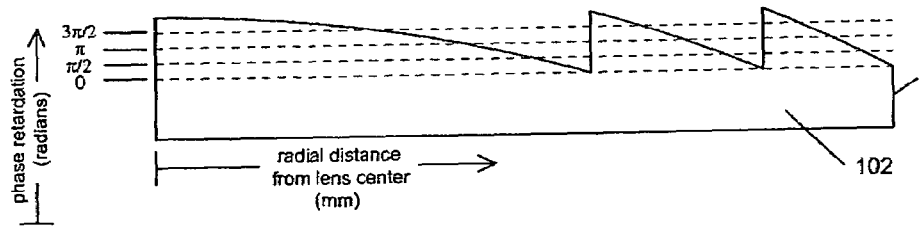
Figure 2D:
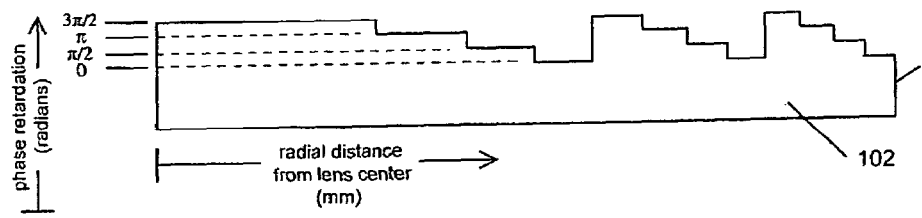

Diffractive lenses, like those shown if FIGS. 2b-2e are simply rotationally symmetric diffraction gratings where the grating period ($\Lambda$, the width of a single Fresnel zone, $r_{j+1}-r_j$) decreases gradually with increasing radius. The angle at which light is diffracted varies inversely with the grating period and as the grating period decreases gradually with radius, light is focused to the same point regardless of where it enters the lens. As such, a discontinuous optical phase profile such as those shown in FIGS. 2b-2d, and those generated in a layer of electro-active material by the electrodes shown in FIG. 2e, may be used to bend light in a smooth and gradual manner. Embodiments of the present invention take advantage of this fact and enable continuous changes in optical power to be produced by optical structures which, by themselves, are only piece-wise continuous. As the thicknesses of these structures are on the order of microns at optical wavelengths, they are typically patterned into or applied to a substrates whose thickness is such to provide sufficient mechanical rigidity. Phase retardation incurred by the substrate material in no way affects the operation of the lens. The division of phase profile 200 into full wave Fresnel zones results in a diffractive phase profile (or blaze profile). If so desired, the wrapped phase profile may be subdivided into a series of equidistant, discrete phase levels as shown in FIGS. 2c and 2d, to approximate the phase profiles of the full wave Fresnel zones of FIG. 2b.

A phase profile may be subdivided into from 2 to about 128 phase levels. The number of resulting phase levels determines the diffraction efficiency of the lens, which is the fraction of incident light that is brought to focus at the design focal length. For a lens with N phase levels, the diffraction efficiency ($\eta$) increases with the number of phase levels and is defined as $\eta=[\sin(\pi/N)/(\pi/N)]^2$. Thus, as the number of phase levels increases, the more the approximated phase profile resembles the actual phase profile, which, in theory, is defined as having a diffraction efficiency of 100%. The phase profile illustrated in FIG. 2d is commonly referred to as a multi-level diffractive phase profile. To generate an actual optical element, these phase profiles may be transferred, by means of an appropriate manufacturing process, into topography changes of the inner surface of physical substrate 102, as defined in FIG. 1a, to create a surface relief diffractive optic, FIG. 2d. Such manufacturing processes include, by way of example only, single point diamond turning, gray-scale lithography, plasma etching, or reactive ion etching.

In an embodiment of the invention, electrodes may be deposited on a surface relief diffractive element or patterned on a mostly planar surface. The number of electrodes required for a surface diffractive element is at a minimum, 2 per layer of electro-active material. Electrodes patterned on a surface may, for example, comprise of a grid of electrodes. A grid pattern of electrodes may comprise of from about 1,000 electrodes to about 100,000 electrodes. Patterned electrodes may also be configured as concentric circles on a substrate, as described below, wherein, the number of desired circles is determined from the number of Fresnel zones (function of optic diameter and optical power) and the number of phase levels per full wave Fresnel zone. The number of electrodes may range from about 100 electrodes to about 4000 electrodes. The overall construction of the electro-active element is similar to that of a commercial liquid crystal display (LCD) and utilizes processes and materials well known in the art.

To make a surface relief diffractive optic electro-active, liquid crystal is placed in optical communication with the diffractive surface and the electro-active functionality of the liquid crystal is used to provide voltage dependent refractive index matching. A liquid crystal that may be applied in an embodiment of the present invention may include, by way of example only, the commercial nematic liquid crystal mixtures E7 or BL037, both of which are available from Merck. The electric field induced change in refractive index is limited by the maximum anisotropy of the refractive index of the liquid crystal materials (commonly referred to as birefringence), which is in excess of 0.2 at optical wavelengths for both of these materials. For these birefringence values, layers of liquid crystal as thin as 5 µm may be used to generate a full wave of phase retardation. Electrodes 109 for applying voltages to the layer of liquid crystal 103 are illustrated, by way of example only, in FIG. 1a as being located between the optical substrate 102 and the liquid crystal layer 103, but may, for example, be placed either directly on the surface relief structure or buried underneath it. When the refractive index of the liquid crystal matches the refractive index of the material from which the diffractive optic is fabricated, light will see a single body of material with uniform refractive index and thus not be diffracted. By applying a voltage to the liquid crystal layer a fully reversible refractive index mismatch can be introduced and light will then be diffracted by the surface relief structure. Examples of a configuration of electrodes 109 within the electro-active lens 108 are detailed below.

Figure 2E:
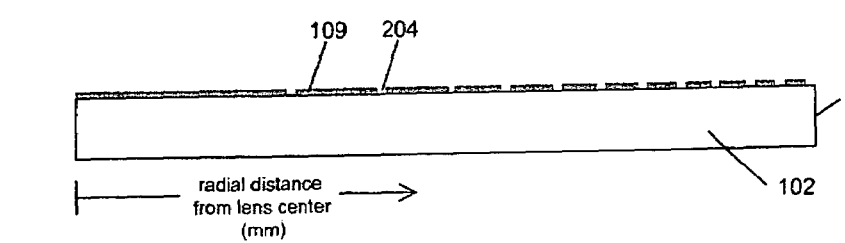

A surface relief structure, as illustrated in FIG. 2d, is not required however, and patterned electrodes placed on the inner surface of physical substrate 102 may be used to generate the desired phase profile within a uniform layer of liquid crystal. The liquid crystal may be of the nematic type and may include, by way of example only, the commercial nematic liquid crystal mixtures E7 or BL037, both of which are available from Merck. The electrodes may be fabricated using means well known in liquid crystal display and semiconductor manufacturing, including, by way of example only, photolithography, thin-film deposition, wet etching, and dry etching. By way of example only, patterned electrodes used to generate the phase profile of the multi-level diffractive optic of FIG. 2d are shown in FIG. 2e, where the electrodes 109 are fabricated from a transparent conductor such as, for example, Indium Tin Oxide (ITO). Other electrode materials may include, by way of example only, the inorganic conductors Tin Oxide or Zinc Oxide; or the organic conductors polyanilline and carbon nano-tubes. Electrodes may be patterned as concentric circles with radii r (ref FIG. 2e) determined from the multi-level diffractive optic of FIG. 2d. In an embodiment of the invention, the thickness of the electrode layer may range from about 5 nm to about 1 µm. A gap 204 remains between the concentric patterned electrodes as shown in FIG. 2e. In an embodiment of the invention, a gap in the range from about 0.1 µm to about 20 µm is preferred. The size of the gap is chosen such that it is equal to or less than the thickness of the liquid crystal layer to ensure that there is a smooth transition of the refractive index between neighboring phase levels defined by neighboring electrodes.

Figure 1B:
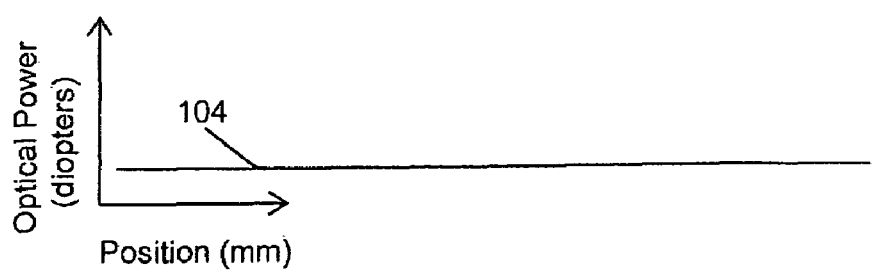
FIG. 1b illustrates an optical power profile of an electro-active lens when the electro-active element is off.
Figure 1C:
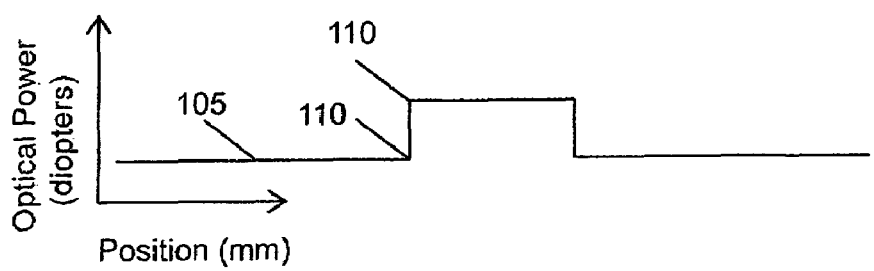
Figure 1D:
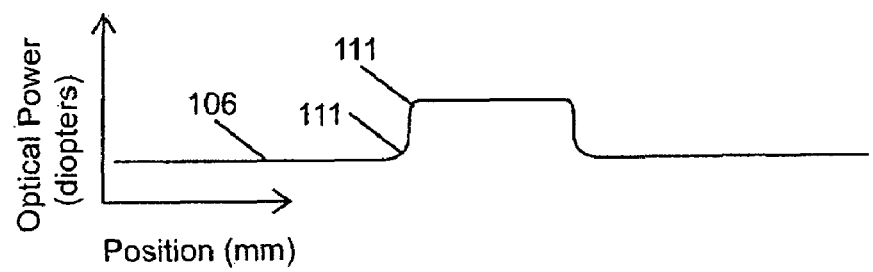

As illustrated in FIGS. 2c, 2d, and 2e, the surface relief structure or the patterned electrodes, respectively, come to an abrupt end at the peripheral edge 205 of the electro-active element 108. Referring again to FIG. 1a, in an embodiment of the present invention, the dynamic, diffractive, electro-active optical element 108 is incorporated within a static (fixed), refractive ophthalmic lens 101. Techniques for embedding an electro-active optical element 108 within a static, refractive ophthalmic lens 101 are described in U.S. Pat. No. 7,077,519, which is incorporated herein by reference. FIGS. 1b through 1d illustrate the effect of the abrupt end of the optical power contributed by the electro-active element 108 within the lens 101, on the combined optical power of the hybrid lens 100. Optical power as a function of electro-active lens 100 position is illustrated in FIGS. 1b-1d. The horizontal axis of FIGS. 1b-1d represents position along the diameter of the lens 100. The vertical axis of FIGS. 1b-1d represents the relative optical power of the lens 100. FIG. 1b illustrates optical power as a function of electro-active lens 100 position when the electro-active element 108 is off. Regardless of whether the surface relief approach or the patterned electrode approach is used, when the electro-active element 108 is off, the refractive indices of all components within electro-active lens 100 may be closely matched. As shown in FIG. 1b, the optical power 104 as a function of the electro-active lens position remains constant across the diameter of the lens 100.

As illustrated in FIG. 1c, when the electro-active element 108 is on, an abrupt jump 110 in the optical power 105 may be seen at the edges of the electro-active element 108. It is this abrupt change in the optical power that the blend region disclosed in the present invention is designed to substantially eliminate. The goal of the present invention is to generate an electro-active ophthalmic lens 100 whose optical power as a function of lens position is shown, by way of example only, in FIGS. 1d. FIG. 1d shows an embodiment of the invention; wherein a blend region is incorporated between the electro-active element 108 and the refractive lens 101. The blend region 111 shown in FIG. 1d, smoothes the transition from the higher electro-active element 108 optical power to the lower refractive lens 101 optical power, as illustrated by the optical power profile 106 along the diameter of the electro-active lens 100.

To design a blended electro-active diffractive lens, the phase profile of an ordinary refractive lens exhibiting the desirable blend region in its thickness profile may first be determined. This process is similar to that described above with reference to FIGS. 2a-2e. However, in the following example, a full diameter of a lens through its thickness is considered. As an example, FIGS. 3a and 3b illustrate the path through which light may travel through an electro-active lens, for example, the electro-active lens 101 of FIG. 1a (not shown in FIGS. 3a or 3b). In an illustrative embodiment of the invention, the electro-active element 108 of FIG. 1a may be embedded in a refractive lens 101 of zero or substantially zero optical power, such as those used for people who require correction for presbyopia but not distance vision. While zero optical power may be chosen for simplicity of the present example, the optical power of the refractive lens used to correct for distance vision errors is not required to design the blend region. As the total optical power of two lenses in contact is simply the sum of their optical powers, blending the optical power of the electro-active diffractive lens to zero with the diffractive blend region described herein results in blending the combined optical power of the electro-active element and refractive element to the power of the refractive element alone. In an illustrative embodiment of the invention, parallel rays of light 307 passing through the electro-active lens in the peripheral region are illustrative of a lens with zero optical power and as such, do not focus the incident light rays (they remain parallel). In an embodiment of the invention, electro-active lens 100 may be a spectacle lens, possessing a phase profile as illustrated in FIG. 3a or 3b, wherein, the focal point 306 is focused on the retina of a wearer's eye. To better illustrate the differences between blended and non-blended lenses, the human eye is not shown in FIG. 3a or 3b, but spectacles lenses according to embodiments of the present invention would normally be placed between 10 mm and 20 mm in front of the outer corneal surface and said lenses would work in conjunction with the optics of the human eye to form a sharp image on the retina.

FIG. 3a shows the phase profile 301 of an electro-active lens without a blend region. The abrupt edge 304 of the phase profile 301 in FIG. 3a is evident where the active area of the electro-active element physically ends within the electro-active hybrid lens. The angle at which light is bent as it travels through the electro-active lens may change abruptly between the refractive lens region and the electro-active element region of the lens in the absence of a blend region.

Referring now to FIG. 3b, the phase profile 302 of an embodiment of an electro-active lens with a blend region 305 is shown. As is illustrated in FIG. 3b, the blend region 305 may provide a smooth continuous change in the angle at which light is bent. This provides a substantially continuous transition in optical power from one region to another. The blend region 305 acts to reduce the effects of an abrupt image jump, which occurs when an image is viewed through an electro-active lens at the edge of an electro-active element. The details of the blend region design process are discussed below.

To illustrate a primary objective of the present invention, simulated images of a square grid as viewed through a region of an electro-active lens without and with blend regions are shown in FIGS. 4a and 4b, respectively. These images are shown below their corresponding optical ray-trace diagrams in FIGS. 3a and 3b. The reduction in image jump, which occurs when there is a mismatch in refractive index, is readily apparent and identified by blend region 305.

Once the overall phase profile has been designed, incorporating phase profile of the electro-active diffractive lens element the blend region phase profile (as detailed below), said profile may be divided into full-wave Fresnel zones and then the appropriate diffractive surface or electrode structure may be generated by phase wrapping as described in reference to FIGS. 2a-2e. Phase wrapping of the combined diffractive lens and blending phase profile differs in no fundamental physical way from the phase wrapping of the lens phase profile, as described in reference to FIGS. 2a-2e. If a surface relief approach is used, the lens including the blend region phase profile may be transferred to the surface of a physical substrate using any of the previously mentioned techniques. If a patterned electrode approach is used, the lens, including the blend region phase profile, may be used to design electrodes that may then be used to apply discrete voltages to a uniform layer of liquid crystal. Determining values for the discrete voltages is achieved by characterizing the phase change incurred by a layer of liquid crystal as a function of applied voltage using an optical technique such as interferometry or ellipsometry. These applied voltages spatially alter the refractive index of the layer of liquid crystal and thus create the phase profile of the lens and the blend region. As the patterned electrode approach utilizes the same phase level values for the lens and the blend region, the voltages applied to the electrodes that define the lens and the electrodes that define the blend region are identical.

Furthermore, in an embodiment of the present invention, when either the surface relief approach or the patterned electrode approach is used, the electro-active lens is intended to be fail-safe. That is, when the voltages applied to the electrodes approach zero, preferably, there would be no contribution of optical power from either the electro-active lens or from the electro-active blend region.

It should also be noted that the optical power blending region according to the present invention differs from the blending of optical power as demonstrated by a conventional progressive addition ophthalmic lens. Progressive addition lenses (PALs) are well known in the art and provide for smooth blending of optical power by changes in curvature of an external refractive surface that are fixed in time. Conversely, embodiments of the present invention provide for smooth blending of optical power by spatial changes in the grating period of a diffractive lens. Furthermore, said means for blending optical power according to embodiments of the present invention are internal to the lens and due to the electro-active functionality, are dynamic.

Figure 5:
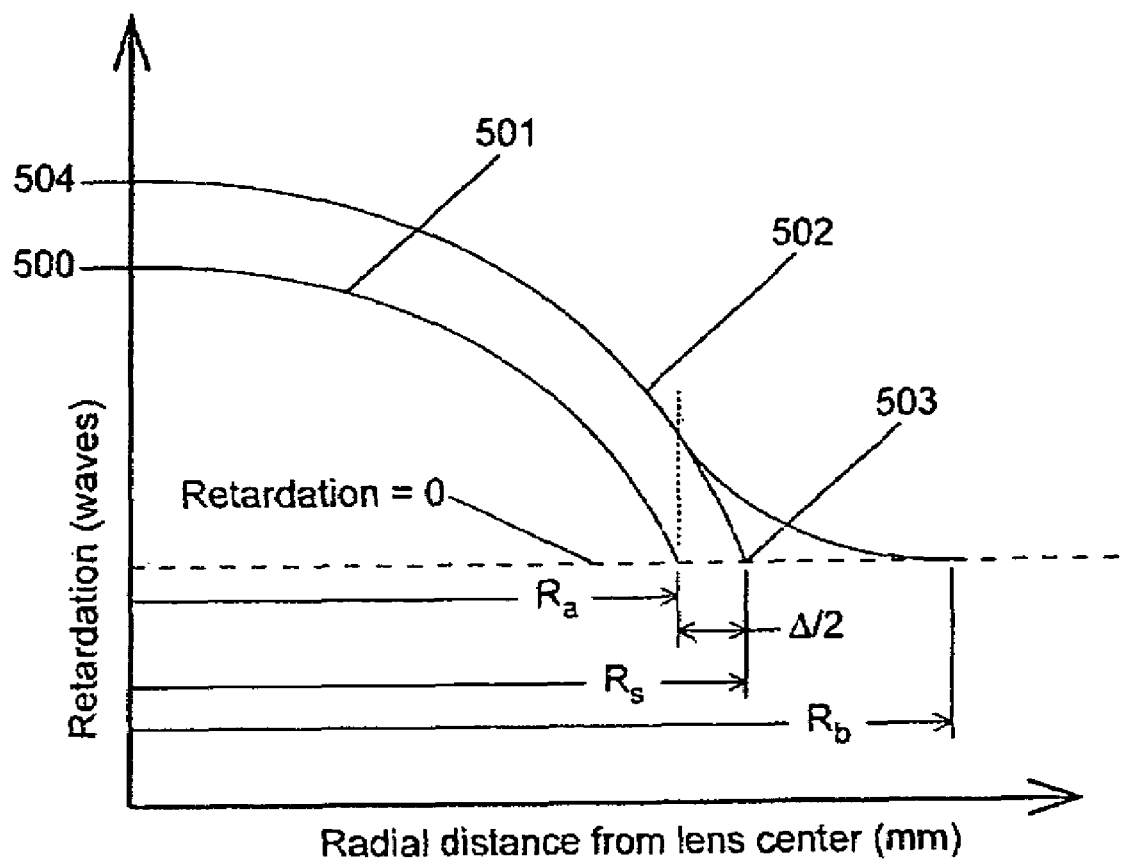
FIG. 5 illustrates the phase profiles of blended and non-blended lens, labeled with the critical dimensions required to design the blend region in accordance with the present invention.

In the general case, a target lens may have a required and specified optical power of $1/f_o$ diopters at a design wavelength and a focal length of $\lambda_o$ and $f_o$, respectively, where the focal length has units of meters and the wavelength has units of micrometers. Reference is now made to FIG. 5, beginning with a phase maximum at the lens center 500, the refractive equivalent to the target lens has a parabolic phase profile 501 with constant optical power out to the edge of the electro-active area at $r=R_a$ (all lens dimensions expressed in units of millimeters) and with phase profile $u(r)=r^2/2\lambda_o f_o$. To design the blend region, an annular region extending outward from radius $R_a$ to $R_b$ is introduced, where it is desired to have the values of both the phase profile and its second derivative (slope) taper smoothly to zero (the substrate reference) over the distance from $r=R_a$ to $r=R_b$. Let the parameter A represent half the width of the annular blend region.

$$\Delta = \frac{R_b - R_a}{2} \quad (1)$$

A modified, non-blended, parabolic phase profile 502 for a lens with the same focusing strength as the target lens is then defined, but with a slightly larger outer radius $R_s$.

$$R_s = R_a + \frac{\Delta}{2} \quad (2)$$

At $r=R_s$, the modified parabolic phase profile intersects the substrate reference level with an abrupt discontinuity 503 in its slope. The modified phase profile function u(r) in terms of the design wavelength and design focal length is defined as follows where u is expressed in units of normalized phase or waves (i.e., phase in radians divided by $2\pi$).

$$u(r) = u_{max} - \frac{r^2}{2\lambda_o f_o} \quad (3)$$

Substituting $u(r)=0$ at $r=R_s$ into equation 3 yields a new phase maxima at the center of the phase profile 504

$$u_{max} = \frac{R_s^2}{2\lambda_o f_o} \quad (4)$$

and $$u(r) = \frac{R_s^2 - r^2}{2\lambda_o f_o} \quad (5a)$$

where the phase profile u(r) has slope $$\frac{du}{dr} = -\frac{r}{\lambda_o f_o} \quad (5b)$$

Inverting equation 5a gives a convenient relation (equation 6) for evaluating the radius of successive full wave Fresnel zone or sub-zone boundaries of the equivalent diffractive lens as the value of u(r) diminishes in equal steps of $2\pi$.

$$r^2 = 2\lambda_o f_o u(r) - R_s^2 = 2\lambda_o f_o [u(r) - u_{max}] \quad (6)$$

In an embodiment of the present invention, the number of successive full wave Fresnel zones which make up the blend region may range from about 1 zone to about 100 zones. The number of successive full wave Fresnel zones in the blend region is the phase value of the blend region at $r=R_a$ divided by $2\pi$.

General Formula for a 3rd Order Blending Polynomial

In this embodiment of the invention, the lens phase profile and its derivative (slope) defined by equations 5a and 5b are used to define a mathematical expression for the phase profile of the blend region. To define said blend region three conditions must be met. First, the outer edge of the electro-active lens must lie at the center of the desired blend region, $r=R_a + \Delta/2$ (refer to FIG. 5). Second, the phase profile of the blend region must start at $r=R_a$, and must match the lens phase profile in both value and slope. And third, at the outer edge of the blend region where $r=R_b$, the value of the blending phase profile must reach zero with zero slope. The simplest function that satisfies these three requirements in general is a third-order polynomial in r, which in this case takes the form $$u_3(r) = \frac{(r+R_s)(R_s + \Delta - r)^2}{8\lambda_o f_o \Delta} \quad (7a)$$

which itself has slope $$\frac{du_3}{dr} = \frac{(R_s + \Delta - r)(\Delta - R_s - 3r)}{8\lambda_o f_o \Delta} \quad (7b)$$

Thus, equation 5a defines the values of the phase profile of the region of constant optical power and equation 7a defines the values of the phase profile of a blend region that satisfies all of the above criteria. Although it is possible in principle to invert equation 7a to find (up to three) values of r for a given value of u, the general solution is less practical to use than numerical methods such as, by way of example only, a root finder, or a straight-forward monotonic search through successive values of r. The blend region may be created as a relief structure or with a patterned electrode methodology identical to that used in creating the non-blended electro-active lens.

General Formula for a 5th Order Blending Polynomial

In another embodiment of the invention, the lens phase profile and its derivative (slope) defined by equations 5a and 5b are again used to define a mathematical expression for the phase profile of the blend region, but under more stringent requirements. In addition to the three requirements of the previous embodiment, further constraints are made on the second derivative of the blending phase profile. Specifically, the second derivative of the blending phase profile must match the second derivative of the lens phase profile at $r=R_a$ and have a zero value at $r=R_b$. The simplest function that satisfies all the aforementioned requirements in general is a fifth-order polynomial in r, which in this case takes the form:

$$u_s(r) = \frac{(R_s + \Delta - r)^3}{8\lambda_o f_o \Delta^2} \left[ \frac{(r - \Delta - R_s)(R_s + 4\Delta + r)}{4\Delta} + 2R_s + \Delta \right] \quad (8a)$$

Here, $R_s$, takes on the value:

$$R_s = \frac{R_b + R_a}{2} \quad (8b)$$

and $\Delta$ is defined in the usual manner.

$$\Delta = \frac{R_b - R_a}{2} \quad (8c)$$

Thus, equation 5a defines the values of the phase profile of the diffractive lens of constant optical power and equation 8a defines the values of the phase profile of a blend region that satisfies all of the above criteria. The blend region may be created as a relief structure or with a patterned electrode methodology identical to that used in creating the non-blended electro-active lens.

Employing the $5^{th}$ order blending polynomial formula has advantages over the $3^{rd}$ order blending polynomial formula. As optical power is the second derivative of the phase profile, the fact that the $5^{th}$ order polynomial provides for the values of the second derivatives of the phase and blend profiles be equal at $r=R_a$ means that there is no abrupt change in optical power at $r=R_a$. The $3^{rd}$ order blending profile does not impose the restriction on the second derivative and as such there may be a slight, but abrupt, change in optical power at $r=_a$.

The mathematical models detailed above may be applied to both unpatterned and patterned electrodes. When incorporating the embodiments of the present invention in an electro-active lens utilizing patterned electrodes, it is preferred that $u_{max}$ be an even, integer number of waves. If this condition is satisfied then electrode signal shunting (as disclosed in U.S. Pat. No. 7,019,890 Meredith et. al.) may be used to generate multiple focal lengths for fixed electrode geometries. If for a given lens design this condition is not satisfied, a small adjustment to the focal length of the lens may be necessary. By way of example only, consider a lens with the following design criteria:

$\lambda_o$=0.555 µm $f_o$=0.5 m (+2.0 diopters)

$R_a$=7.5 mm $R_b$=9.5 mm

Figure 6:
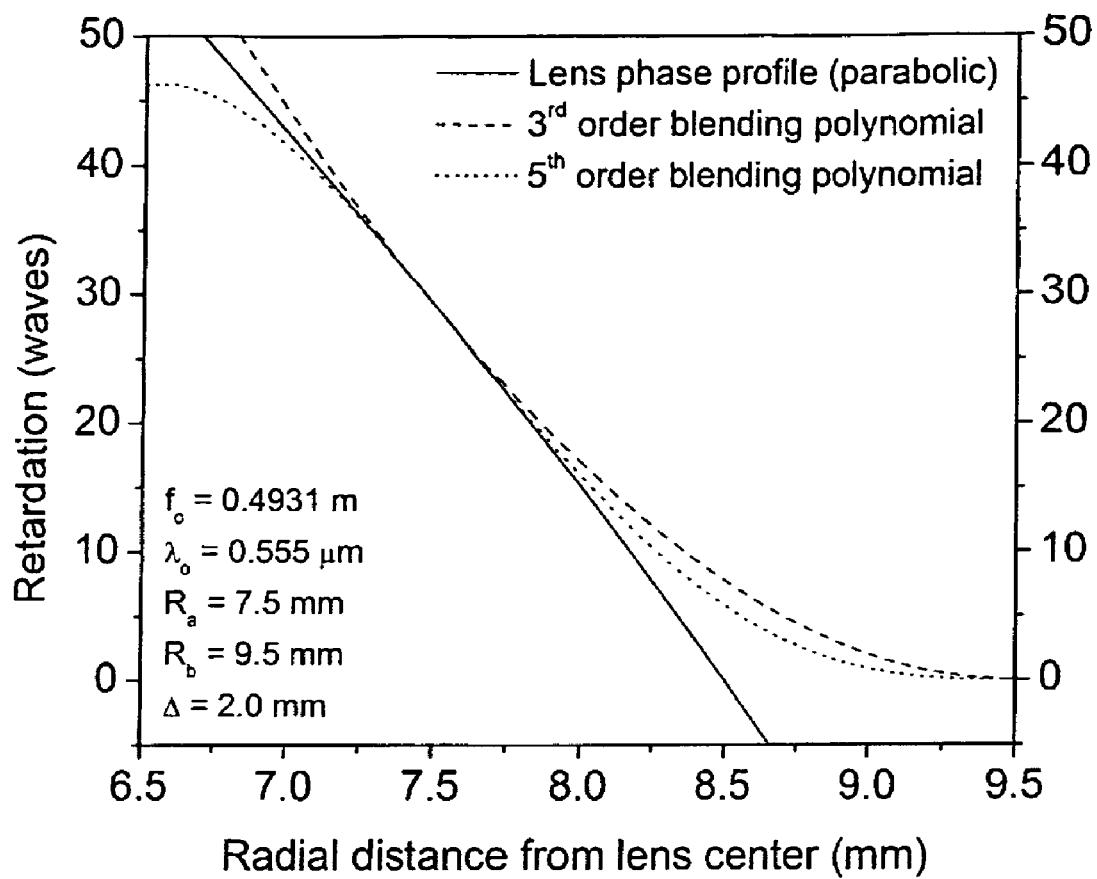
FIG. 6 shows the parabolic phase profile of an ideal lens as well as third-order and fifth order polynomial blending profiles.

In this case, $u_{max}$=130.180 waves. Adjusting $u_{max}$ upward to 132 implies a focal length shift to $f_o$=0.4931 m (2.028 diopters) while adjusting $u_{max}$ downward to 130 changes the focal length to $f_o$=0.5007 m (1.997 diopters). Examples of a lens phase profile and third and fifth order phase blending profiles are shown in FIG. 6 for the case where umax is chosen to be 132 waves ($f_o$=0.4931 m). FIG. 6 illustrates the blend region of interest 503 as identified in FIG. 5. The horizontal axis of FIG. 6 indicates the radius r, the position along the lens from the lens center, with a range in region of interest of the current example. The vertical axis of the lens phase profile indicated retardation, measured in normalized phase or waves (phase in radians divided by $2\pi$).

While polynomial blending functions have been used here, any mathematical relation, either alone or in combination, may be used to design the blend region. Such relations may include trigonometric functions, exponential functions, hyperbolic functions, or logarithmic functions, by way of example only.

In other embodiments of the invention, the electro-active lens may incorporate a fixed optical power and an astigmatic optical power, to correct a wearer's astigmatism. Astigmatic power correction may preferably be incorporated within the static refractive lens and not within the electroactive element.

EXAMPLE

Figure 7A:
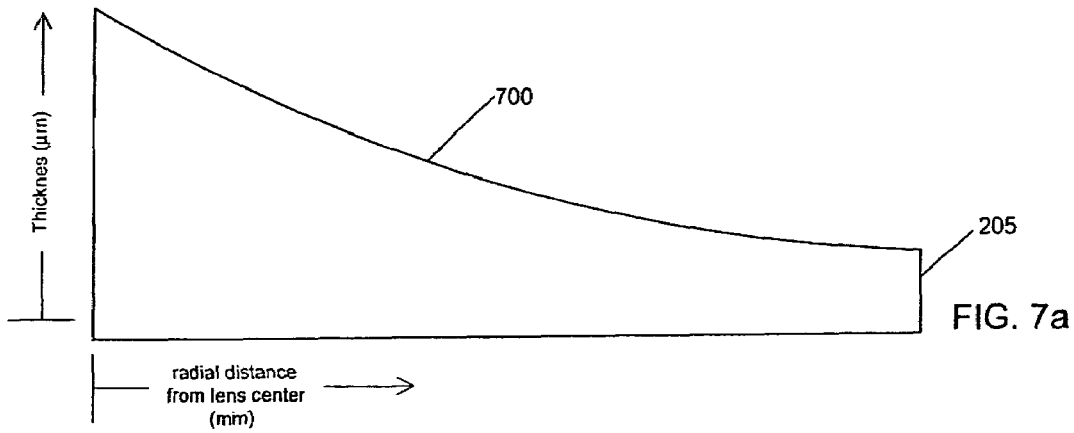
FIG. 7a illustrates the thickness profile of a refractive blend region, designed in accordance with the present invention.
Figure 7B:
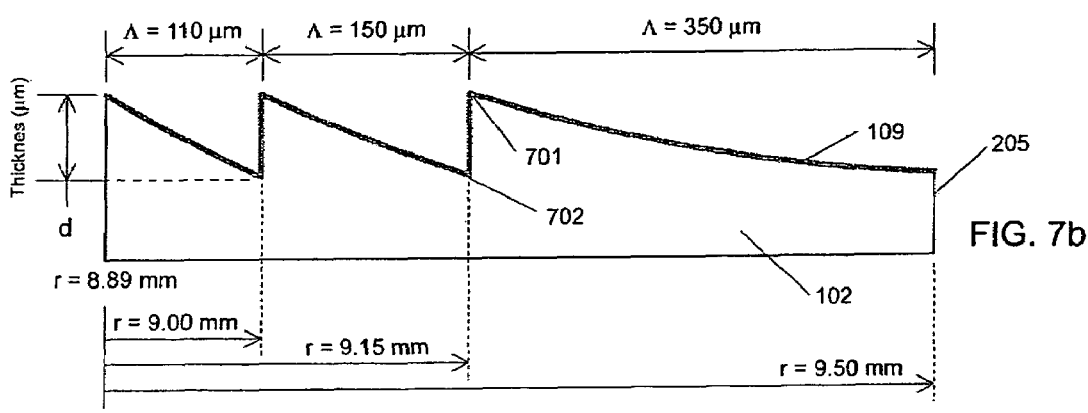
FIG. 7b illustrates the thickness profile of a continuous, surface relief diffractive blend region, designed in accordance with the present invention.
Figure 7C:
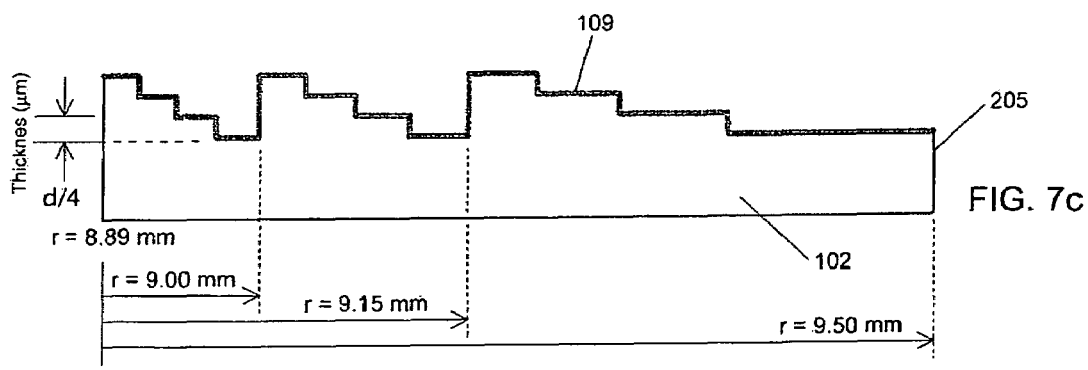
FIG. 7c illustrates the thickness profile of a multi-level, surface relief diffractive blend region, designed in accordance with the present invention.

It is to be understood that the following example of the present invention is not intended to restrict the present invention since many more modifications may be made within the scope of the claims without departing from the spirit thereof A prophetic example of an embodiment of the present invention is illustrated in FIGS. 7a-7d. Consider a lens with a desired focal length $f_o$ of 0.5 m (+2.0 diopters) at a wavelength $\lambda_o$ of 0.555 µm. Said lens has a required diameter of constant add power of 15 mm ($R_a$=7.5 mm) and a 2 mm optical power blending region ($\Delta$=2.0 mm, $R_b$=9.5 mm). As with the previous example, it is desired, for the illustrative example herein, to obtain an even, integer number of full wave Fresnel zones, so the focal length is adjusted to 0.4931 m (+2.028 diopters). Given these parameters, a third order blending polynomial is chosen and equation 7a is used to generate phase profile values from $r=R_a$ to $r=R_b$, and equation 5a is used to generate lens phase profile values from $r=0$ to $r=R_a$, where the values of $R_s$, is 8.5 mm ($R_s=R_a+\Delta/2$). FIG. 7a shows the thickness profile 700 of a refractive blend region designed according to equation 7a and using the aforementioned design parameters. The thickness of material shown in FIG. 7a corresponds to 3 waves of optical retardation and thus, the last three full wave Fresnel zones of the blend region. To determine the materials from which the blended lens is fabricated the refractive indices of the liquid crystal must first be known. The commercial nematic liquid crystal mixture E7 (available from Merck) is a suitable choice as it has a large refractive index modulation (birefringence) of approximately 0.23, where the refractive index values can be continuously tuned from approximately 1.52 to approximately 1.75. The refractive index of the material from which the blended lens is fabricated must substantially match one of the refractive indices of the liquid crystal and the UV curable resin AC L2002-C1 (available from Addison Clear Wave), with a refractive index of approximately 1.52, is suitable. As shown in FIG. 7b, the corresponding phase profile is phase wrapped and the thickness profile corresponding to the wrapped phase is then patterned into the surface of a substrate 102, where for the materials described above, the thickness d is such that there is a $2\pi$ (or 1 wave) phase retardation between the highest 701 and lowest 702 points of the thickness profile. The thickness d may be calculated from the formula $\phi=[2\pi(n_{Lc}-n_{UVresin})]/\lambda_o$, which for the case of $\phi=2\pi$ at a design wavelength ($\lambda_o$) of 0.555 µm, is found to be approximately 2.4 µm. The radii of the full wave Fresnel zones (phase wrap points) as well was the grating periods are indicated in FIG. 7b for reference. As can be seen in FIG. 7b, the grating period ($\Lambda$) now increases as a function of radius, gradually decreasing the angle at which light is diffracted thereby enabling a continuous change in optical power. The patterned surface is then coated with a transparent electrode 109, such as ITO, so that when it is placed in contact with the liquid crystalline material, switching of the optical power may be enabled. FIG. 7c illustrates an example of the multilevel analog of the electro-active blend region of FIG. 7b, where the height of each successive level is ¼ that of the total height of the continuous structure shown in FIG. 7b.

Figure 7D:
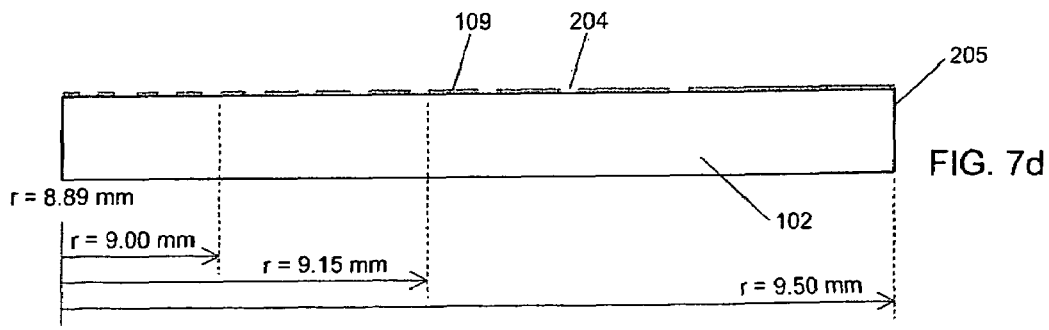
FIG. 7d illustrates patterned electrodes meant to generate a multi-level, surface relief diffractive blend region, designed in accordance with the present invention, within a layer of electro-active liquid crystal.

Fabrication of embodiment of the structures depicted in FIGS. 7a and 7c may be accomplished by either single point diamond turning the structure into the cured resin, or by single point diamond turning a mold and curing the resin within the mold, or by other methods known to those skilled in the art FIG. 7d illustrates enabling an embodiment of a blend region using the patterned electrode approach, where each electrode 109 acts to define a discrete phase level, akin to that of FIG. 7c, within a neighboring layer of electro-active material. Like the patterned substrate approach, the refractive index values of the liquid crystal and the substrate material must be substantially matched. For the case of the liquid crystal E7, the optical glass AF-45, available from Schott, has a refractive index of approximately 1.52 and is a good choice. To this substrate, layers of the transparent conductor Indium Tin Oxide are applied and patterned using standard photolithography techniques. The dimensions (radii and widths) of the individual electrodes are nearly identical to the dimensions of the phase levels of the multi-level surface relief approach; the difference lies in the fact that an inter-electrode gap must be provided for in the multi-electrode approach. Once the blended power electro-active element has been fabricated, it must be embedded within a static, refractive lens of substantially equal refractive index. While no commercial material for ophthalmic lenses with a refractive index of 1.52 exists, a custom resin could be formulated or the commercially available material Trivex (from Pittsburgh Plate Glass, PPG), with a refractive index of 1.53, would be the closest match.

Although the particular embodiments shown and described above will prove to be useful in many applications in the ophthalmic art to which the present invention pertains, further modifications of the present invention will occur to persons skilled in the art. All such modifications are deemed to be within the scope and spirit of the present invention as defined by the appended claims.

What is claimed is:

1. An electro-active lens, comprising at least one electro-active blend region, wherein when electrical power is applied thereto, said blend region provides a substantially continuous transition of optical power from a first region of optical power to a second region of optical power of said lens, wherein a surface relief diffractive structure produces said blend region.

2. The lens of claim 1, wherein a patterned electrode structure produces said blend region.

3. The lens of claim 1, wherein phase-wrapped, full-wave Fresnel zones produce said blend region.

4. The lens of claim 1, wherein said transition of optical power is described by a polynomial of second order or higher.

5. The lens of claim 1, wherein said transition of optical power is described by any continuous mathematical function.

6. The lens of claim 1, wherein said transition of optical power is described by a combination of at least two continuous mathematical functions.

7. The lens of claim 1, wherein the optical power of said blend region is modulated by application of a voltage.

8. An electro-active lens, comprising:
 a. a refractive lens of fixed optical power; and
 b. an electro-active element having dynamic optical power and a peripheral edge in optical communication with said refractive lens, wherein the optical power of said electro-active lens is the sum of the optical powers of said electro-active element and said refractive lens, and when said electro-active element is activated, said electro-active element provides for a region of substantially continuous transition in optical power from the sum of optical powers of said electro-active element and said refractive lens to the optical power of said refractive lens, and wherein said transition region is located near the peripheral edge of said electro-active element, wherein diffraction of optical waves produces the transition of optical power.

9. The lens of claim 8, wherein the optical power of the electro-active element is mostly constant over a portion of its area.

10. The lens of claim 8, wherein the optical power of the electro-active element can be modulated by the application of at least two voltages.

11. The lens of claim 8, wherein the transition of optical power of the electro-active element gradually reduces to a substantially zero value.

12. The lens of claim 8, wherein phase wrapped, full-wave Fresnel zones produce the transition of optical power.

13. The lens of claim 8, wherein a patterned electrode structure produces the transition of optical power.

14. The lens of claim 8, wherein the transition of optical power is described by any continuous mathematical function.

15. An electro-active lens, comprising:
a. a refractive lens of fixed optical power, and
b. an electro-active element having dynamic optical power and a peripheral edge in optical communication with said refractive lens, wherein the optical power of said electro-active lens is the sum of the optical powers of said electro-active element and said refractive lens, and when said electro-active element is activated, said electro-active element provides for a region of substantially continuous transition in optical power from the sum of optical powers of said electro-active element and said refractive lens to the optical power of said refractive lens, and wherein said transition region is located near the peripheral edge of said electro-active element, wherein a surface relief diffractive structure produces the transition of optical power.

16. An electro-active lens, comprising at least one electro-active blend region, wherein when electrical power is applied thereto, said blend region provides at least one stepped transition of optical power from a first region of optical power to a second region of optical power of said lens, wherein a surface relief diffractive structure produces said blend region.

17. The lens of claim 16, wherein a patterned electrode structure produces said blend region.

18. The lens of claim 16, wherein the optical power of said blend region is modulated by application of a voltage.

19. An electro-active lens, comprising:
a. at least one region of fixed optical power; and
b. at least one region of dynamic optical power having a blend region, wherein when electrical power is applied to said blend region, said blend region has diffractive power and provides a continuous transition of optical power from said dynamic power region to said fixed power region, wherein a surface relief diffractive structure produces said blend region.

20. The lens of claim 19, wherein a patterned electrode structure produces said blend region.

21. The lens of claim 19, wherein phase-wrapped, full-wave Fresnel zones produce said blend region.

* * * * *